US007680893B2

(12) United States Patent
Keohane et al.

(10) Patent No.: US 7,680,893 B2
(45) Date of Patent: Mar. 16, 2010

(54) METHOD FOR IMPLEMENTING ELECTRONIC MAIL DICTIONARY TRANSPORTER

(75) Inventors: Susann M. Keohane, Austin, TX (US); Gerald F. McBrearty, Austin, TX (US); Shawn P. Mullen, Buda, TX (US); Jessica Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 11/620,343

(22) Filed: Jan. 5, 2007

(65) Prior Publication Data

US 2008/0168141 A1 Jul. 10, 2008

(51) Int. Cl.
*G06F 13/00* (2006.01)
(52) U.S. Cl. ........................ 709/206; 709/219; 709/224

(58) Field of Classification Search .................. 709/206, 709/217, 219, 223, 224
See application file for complete search history.

(56) References Cited

U.S. PATENT DOCUMENTS 7,032,174 B2 * 4/2006 Montero et al. ............. 715/257
2004/0148381 A1 * 7/2004 Beppu et al. ................ 709/223
2005/0267738 A1 * 12/2005 Wilkinson et al. ............. 704/9

* cited by examiner

*Primary Examiner*—Viet Vu
(74) *Attorney, Agent, or Firm*—Dillon & Yudell LLP

(57) ABSTRACT

A method, system and computer program product that creates a transport dictionary, which links preferential terms and definitions to the Multipurpose Internet Mail Extension (MIME) of an outgoing electronic mail (email). Prior to sending a message, users are provided the option of transporting words or acronyms unique to the dictionary of the sender and recipient, which have been utilized in the outgoing email message. Linking dictionary preferences to the outgoing email provides clarity to terms utilized in the email message and decreases the amount of time a responder has to spend skipping, adding, or defining terms that are unique to the incoming MUA dictionary.

17 Claims, 7 Drawing Sheets

METHOD FOR IMPLEMENTING ELECTRONIC MAIL DICTIONARY TRANSPORTER

BACKGROUND OF THE INVENTION

1. Technical Field

The present invention generally relates to electronic mail system and in particular to electronic mail dictionaries. Still more particularly, the present invention relates to a method and system for linking electronic mail dictionaries.

2. Description of the Related Art

Electronic mail (email) is extensively utilized as a professional, educational, and personal mode of communication. Mail user agents (MUA) such as Eudora™, IBM Lotus Notes™, Microsoft Outlook™, and Outlook Express™ provide interfaces that allow users to spell check and personalize documents prior to transmitting the message to the intended receiver(s) over the Internet. While the methods for spell checking and personalizing documents have proven to be effective, there are many disadvantages associated with linking the spelling preferences of a dispatched message with the spelling preferences of an intended email recipient.

Several problems exist with sending email messages with personalized spellings and/or definitions of acronyms and words. First, a user may prepare an email with an acronym that has been intentionally skipped during spell check or a word with a desired misspelling. During response to the email, the intended receiver(s) may utilize terminology received in the email, and is prompted to skip or change the spelling of the perceived misspelled word(s) during spell check. Next, the use of acronyms, words, or terminology may be utilized in a corporation or institution but not to the recipient of the email message. During response to the message, a spell check command forces the recipient to address all words, even those words with spellings relative to the terminology being discussed.

The task of skipping acronyms or words of intentional misspelling during response to an email is time consuming and unnecessary. The recipient of an email message may receive a word or acronym that is not frequently utilized or available in a public dictionary, but contains significant meaning to the user or organization of origin. Corporations such as engineering firms, research facilities, financial institutions, and many other companies often utilize words that are defined solely by their organization. Also, there are definitions of words and acronyms that may not exist in the recipient's email preferences. Therefore, the recipient(s) may not understand the undefined word(s) or acronym(s) in the received message.

Dictionaries and spell checking applications exist in current mail user agents. Applications have been implemented to check misspelled words, improper grammar, and inappropriate words found in an email prior to distribution. However no MUA allows an email message to link words and acronyms with desired misspellings to dictionary preferences of the email recipient. Words and acronyms with definitions unique to an organization or user may not be transported to the email recipient as correct words or terminology. Therefore, the spell check of a responding message must also address words and terminology with desired misspellings that were skipped, defined, or added as words in the received email message.

SUMMARY OF THE INVENTION

Disclosed is a method for creating a transport dictionary that links preferential terms and definitions to the Multipurpose Internet Mail Extension (MIME) of an outgoing electronic mail (email). Prior to sending a message, users are provided the option of transporting words or acronyms unique to the dictionary of the sender and recipient, which have been utilized in the outgoing email message. Linking dictionary preferences to the outgoing email provides clarity to terms utilized in the email message and decreases the amount of time a responder has to spend skipping, adding, or defining terms that are unique to the incoming Mail user agent (MUA) dictionary.

In one embodiment, the invention provides a method for transporting vocabulary unique to a MUA to the dictionary preferences of the recipient MUA. The vocabulary of the outgoing email may be words, acronyms, or phrases unique to a person, company, project, or organization and which may be identified as a misspelled word during spell check of the responding email. A dictionary transporter encodes the dictionary preference of the outgoing email messages through MIME. Upon receipt of the incoming email message, the recipient has the option to accept or deny the transported dictionary preferences. If the user accepts the unique vocabulary of the transported dictionary, the recipient's MUA parses the incoming message and accepts the dictionary modifications.

In another embodiment of the invention the dictionary transporter may be utilized as software integrated into an existing MUA. The user may select "Dictionary Transporter" options in a menu to identify preferences for transporting words, acronyms, and phrases unique to the recipient MUA. The user may identify preferences exclusive to the current message, or universal to all outgoing mail. Options are provided to add words and definitions to the dictionary transporter or change words and definitions in the dictionary transporter.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
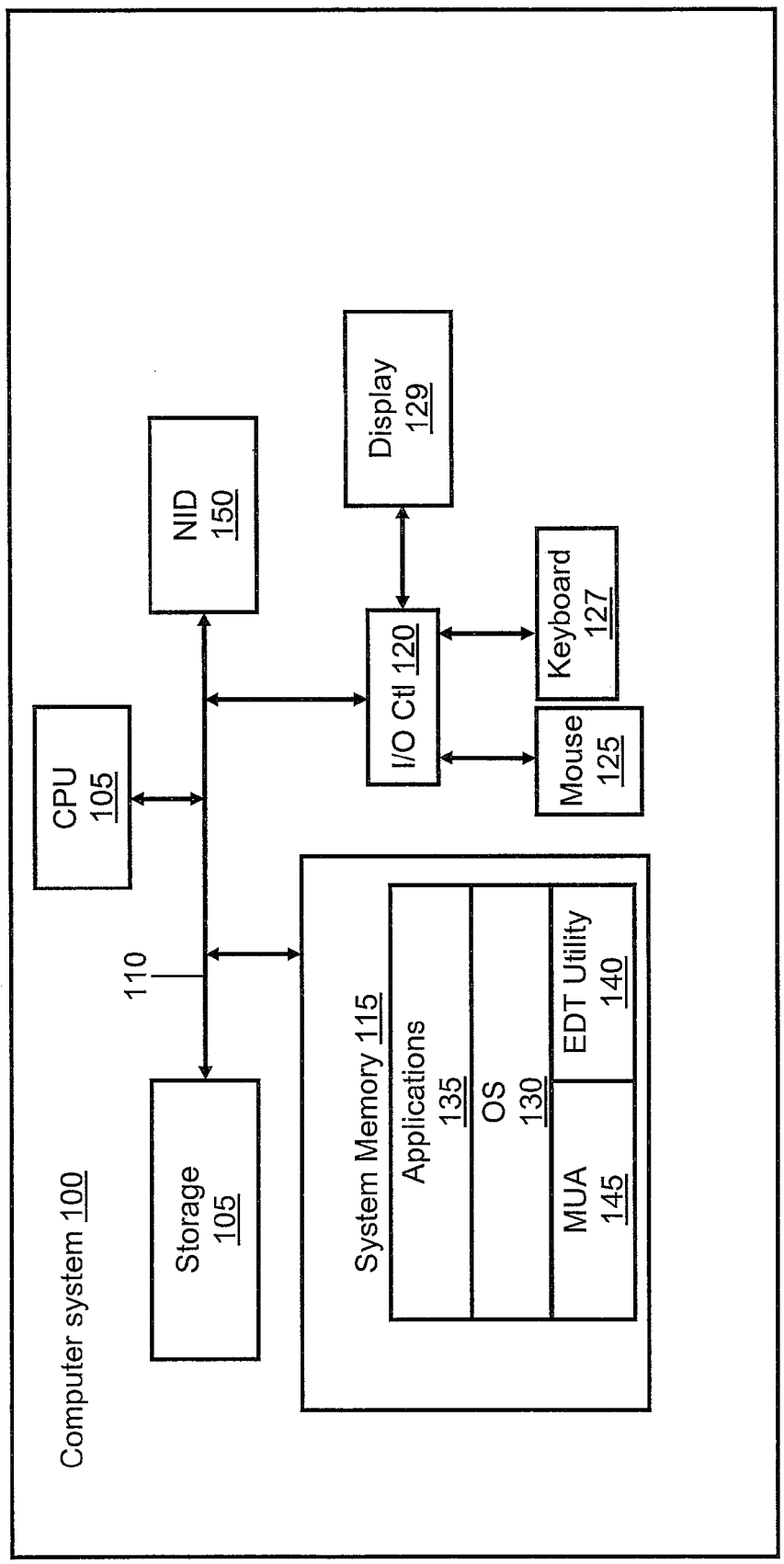
FIG. 1 is a diagram of an example data processing system utilized to implement an illustrative embodiment of the present invention.

The present invention provides a method, system and computer program product for creating a transport dictionary that links preferential terms and definitions to the Multipurpose Internet Mail Extension (MIME) of an outgoing electronic mail (email). Prior to sending a message, users are provided the option of transporting words or acronyms unique to the dictionary of the, which have been utilized in the outgoing email message. Linking dictionary preferences to the outgoing email provides clarity to terms utilized in the email message and decreases the amount of time a responder has to spend skipping, adding, or defining terms that are unique to the incoming mail user agent (MUA) dictionary.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is also understood that the use of specific parameter names are for example only and not meant to imply any limitations on the invention. Embodiments of the invention may thus be implemented with different nomenclature/terminology utilized to describe the above parameters, without limitation.

With reference now to the figures, FIG. 1 depicts a block diagram representation of a data processing system within which features of the invention may be advantageously implemented. Computer system 100 comprises a central processing unit (CPU) 105 coupled to a system memory 115 via a system bus/interconnect 110. Also coupled to system bus 110 is an input/output controller (I/O Controller) 120, which controls access by several input devices, of which mouse 125 and keyboard 127 are illustrated. I/O Controller 120 also controls access to output devices, of which display 129 is illustrated. In order to support use of removable storage media, I/O Controller 120 may further support one or more USB ports (not specifically shown) and compact disk Read/Write (CDRW)/digital video disk (DVD) drive.

Computer System 100 further comprises network interface device (NID) 150 by which computer system 100 is able to connect to and communicate with an external device or network (such as the Internet). NID 150 may be a modem or network adapter and may also be a wireless transceiver device.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as software instruction stored within system memory 115 or other storage and executed by CPU 105. Among the software instruction are instructions for enabling network connection and communication via NID 150, and more specific to the invention, instruction for enabling the email dictionary transporter (EDT) utility features described below. For simplicity, the collective body of instruction that enables the email dictionary transporter features is referred to herein as EDT utility. In actual implementation, the EDT utility may be added to existing MUA instruction to provide the MUA functionality described below. Thus, as shown by FIG. 1, in addition to the above described hardware components, data processing system 100 further comprises a number of software components, including operating system (OS) 130 (e.g., Microsoft Windows®, a trademark of Microsoft Corp, or GNU®/Linux®, registered trademarks of the Free Software Foundation and The Linux Mark Institute) and one or more software applications, including EDT utility 140 and mail user agent (MUA) 145 (e.g. Eudora™, IBM Lotus Notes™, Microsoft Outlook™, and Outlook Express™).

In implementation, OS 130, EDT utility 140, and MUA 145 are located within system memory 115 and executed on CPU 105. According to the illustrative embodiment, when CPU 105 executes MUA 145 and EDT utility 140, EDT utility 140 enables computer system 100 to complete a series of functional processes, including: (1) Encoding the dictionary transporter into outgoing email; (2) Integrating the dictionary transporter in an mail user agent interface; and (3) Selecting the dictionary transporter user preferences; and other features/functionality described below and illustrated by FIGS. 2-7.

In one embodiment of the invention, the dictionary transporter is encoded into the outgoing email according to Multipurpose Internet Mail Extension (MIME) standards. MIME refers to an official Internet Engineering Task Force (IETF) standard that specifies how messages must be formatted so that they can be exchanged between different email systems. Electronic messages are delivered over the Internet as Request for Comments 822 (RFC822) American Standard Code for Information Interchange (ASCII) streams. MIME is a protocol that extends RFC822 for processing electronic messages that contain structured data, unstructured data, and non-text information across the Internet. MIME allows the dictionary transporter to be detected without the need for the receiving MUA parser to understand the dictionary transporter data content. FIGS. 2A-2B illustrate utilization of the RFC822/MIME protocol.

As shown by FIG. 2A, Network 200 comprises computer system 100 that is connected to Internet 202. Computer system 100 transmits email 216 and dictionary transporter 206 to MUA Y 210 from MUA X 208 via RFC822/MIME 204. Dictionary transporter 206 is a electronically transmitted dictionary that links unique terms and definitions of an outgoing email to the dictionary of the email recipient. Internet 204 allows MUA X 208 to send email 216 with dictionary transporter 206 from computer system 100 to MUA Y 210 on computer system 100, and vise verse. Internet 202 transmits messages via RFC822/MIME 204 in ASCII text format to and from MUA Y 210.

In one embodiment of the invention, MUA X 208 utilizes computer system 100 to create an email. While creating the outgoing message with MUA X 208, the user executes EDT utility 140 (FIG. 1). Terminology and definitions unique to the dictionary of MUA X 208 are transmitted with an email message from MUA X 208 as a content-type defined by the MIME. The encoded message is sent via RFC822/MIME 204 through Internet 202. MUA Y 210 receives the incoming email encapsulated in an electronic envelope. MUA Y 210 parses the received email from MUA X 208 and partitions the email into segments according to IETF standards. MUA Y 210 displays the received email and dictionary transporter 206 enables the MUA to display the terminology and definitions added to the email message when composed by MUA X 208.

In one embodiment of the invention, MUA X 208 and MUA Y 210 distinguish standard email attachments from attachments provided by dictionary transporter 206 through labels. FIG. 2B displays content title description 220 and content label description 222 for the MIME standard. The following MIME standard content titles are displayed in FIG. 2B: content-type 224, content-transfer-encoding 226, content-disposition 228, and content-description 230. Content-type 224 identifies the Internet media type of the email content. The header label of content-type 224 identifies whether email 216 contains plain text, image, audio, applications, etc. Content-transfer-encoding 226 is used to specify how a MIME message or body part has been encoded, so that the email recipient may decode the MIME message. Content-disposition 228 is an extension to the MIME protocol that instructs the recipient MUA on how the file of dictionary transporter 206 should be displayed. Content-description 230 provides a label with a description of the attached content.

In an example embodiment of the invention, content-type 224 for dictionary transporter 206 is seen in content-type label 232, which describes the dictionary transporter as an attached application. Content-transfer-encoding 226, encodes the message as "base64" in content-transfer encoding label 234. Content-transfer-encoding label 234 represents binary data of dictionary transporter 206 in ASCII text format. Content-disposition label 236 contains the filename of the attachment to be displayed by the recipient MUA. Content-description label 238 describes the incoming dictionary transporter attachment.

In one embodiment, MUA X 208 adds words and definitions from dictionary transporter 206, utilizing interfaces illustrated in FIG. 3A, FIG. 3B, and FIG. 3C. FIG. 3A illustrates a graphical user interface for electronic mail, or email interface 314. Email interface 314 of FIG. 3A includes basic field requirements of the IETF standards: To address field 302, From address field 304, and Subject field 306. Email interface 314 also comprises text field 312, utilized for entering outgoing messages. Various, functions Link 307, Send 308, and Exit 310 provide the ability to encode and send the email via RFC822/MIME 204 (FIG. 2), or exit the email interface without sending mail.

Figure 2:
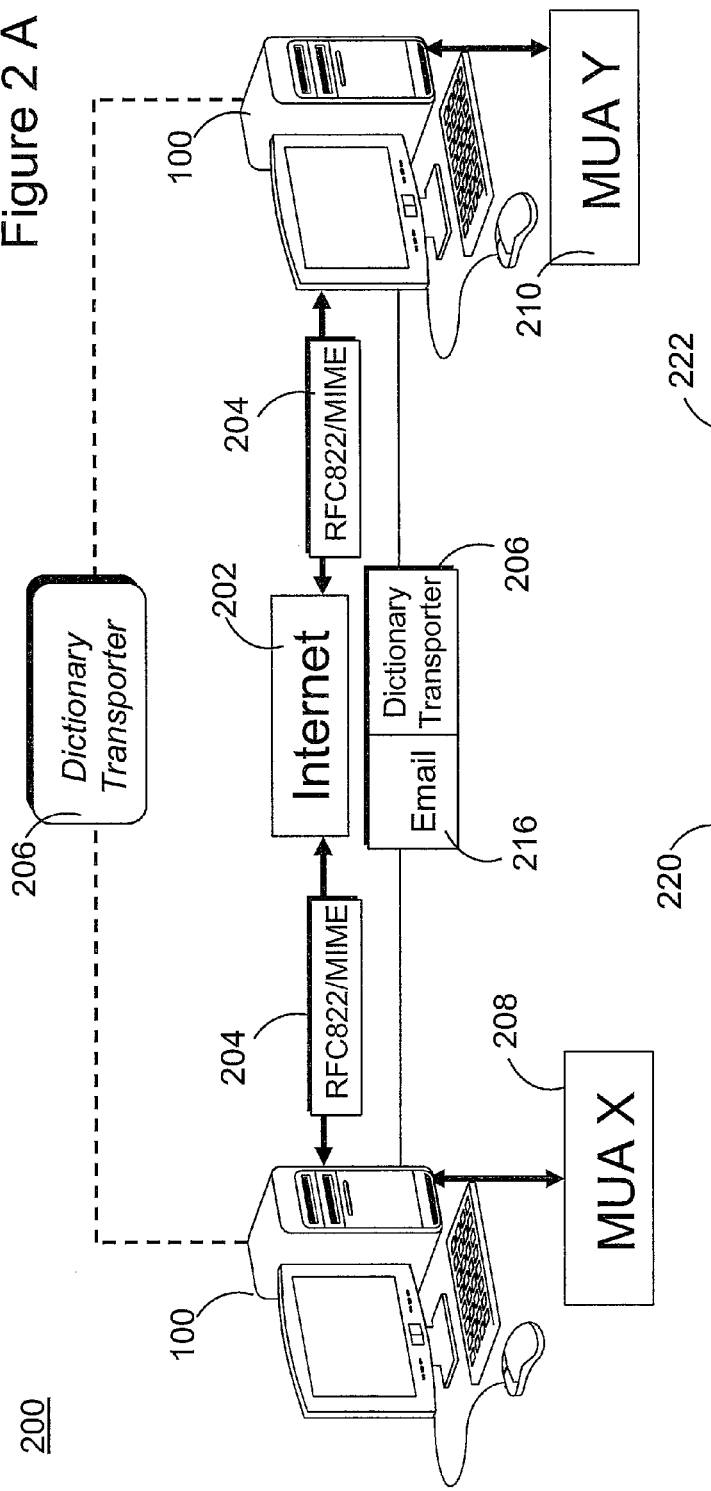
FIG. 2A is a diagram of computers with mail user agent software linked to the Internet in accordance with an illustrative embodiment of the present invention.
FIG. 2B is a table of MIME standard content labels in accordance with an illustrative embodiment of the present invention.

FIG. 3B illustrates a transport word interface 324 utilized to edit "misspelled" words or acronyms to send via dictionary transporter 206 (FIG. 2). Word field 320 displays the term or word unfamiliar to the MUA dictionary during spell check. Change field 322 displays suggested replacements for the perceived misspelled term. The MUA may select the change function 326 to replace the term in word field 320 with the suggested word in change field 322. The EDT utility may add the selected term to the dictionary transporter with add function 328. Selecting next function 330 may skip the word in field 320, or transport word interface 324 may be exited by selecting exit function 332.

In the illustrative embodiment, interface 334 of FIG. 3C comprises word field 320, definition field 342, add function 348 and exit function 352. Definition field 342 allows the email client to enter the definition of the perceived misspelled word.

In one embodiment, a word from text field 312 may be highlighted by the MUA as misspelled. The email client selects the first highlighted word to edit (selection illustrated with gray) with word transporter 324. The email client chooses to add the word with the perceived misspelling to the dictionary transporter by selecting add function 328 (selection illustrated with gray). Then, the email client may choose to add a definition to the word in definition field 342. Selecting add function 328 displays interface 334, which prompts the email client to add a definition to the dictionary transporter or exit the interface.

Figure 4:
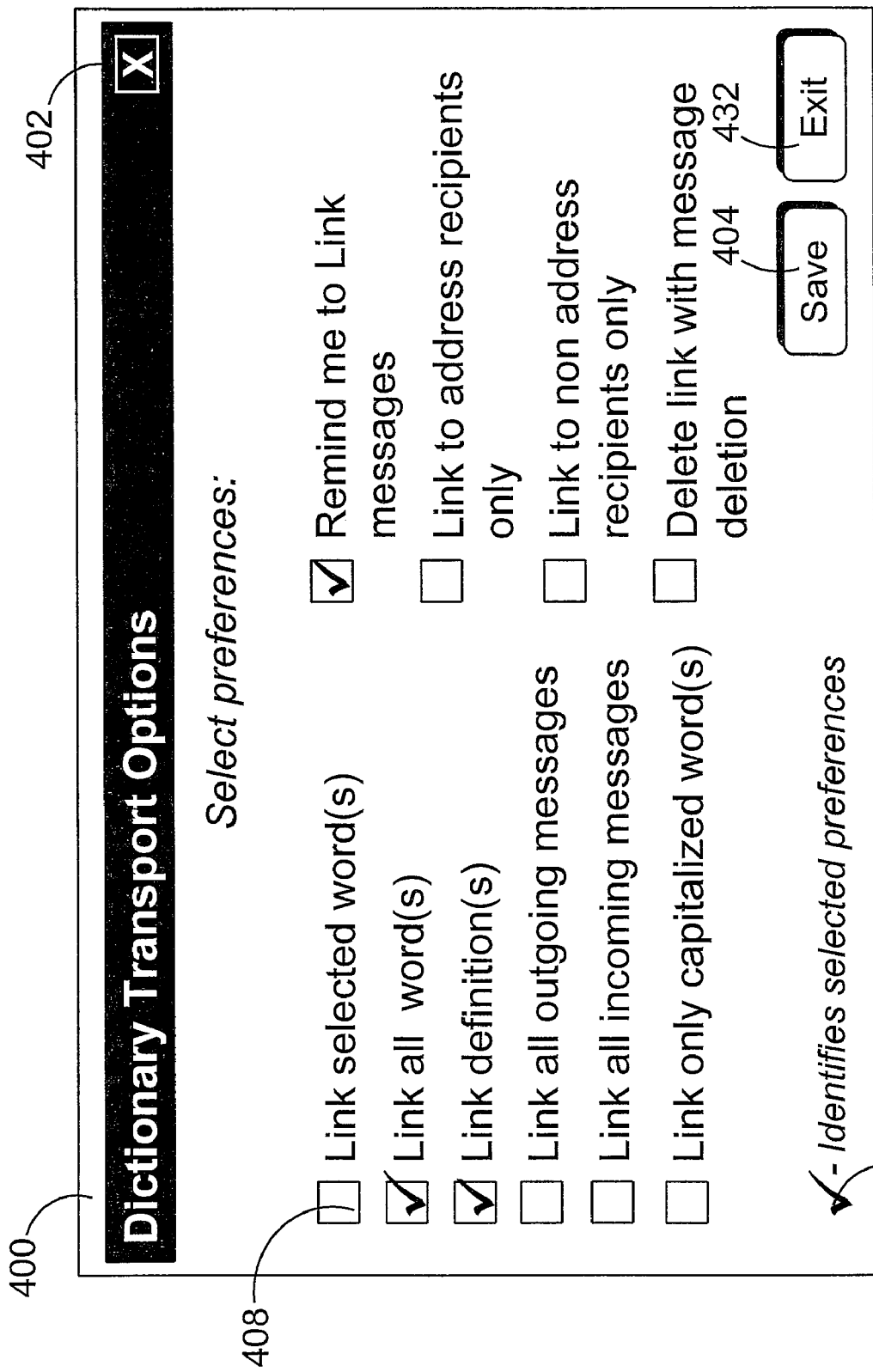
FIG. 4 illustrates a graphical user interface for selecting dictionary transporter preferences according to one embodiment of the invention.

FIG. 4 is an illustrative embodiment comprised of a dictionary transport option interface. Options interface 400 displays optional preferences for linking and utilizing the dictionary transport. An email client may select each requested preference from options interface 400 by selecting square 408 next to the preference. Check mark 406 identifies the selected preference. Save function 404 and exit function 432 allow the preferences to be save to the dictionary transporter.

In one embodiment, the email client may choose to personalize the dictionary transporter of a MUA. Dictionary transport option interface 400 may be selected through the "Tools" function of the MUA. The email client selects preferences of the EDT utility such as link word(s) and definition (s), as well as reminders to link the dictionary transporter to the outgoing message via link function 307.

Figure 3:
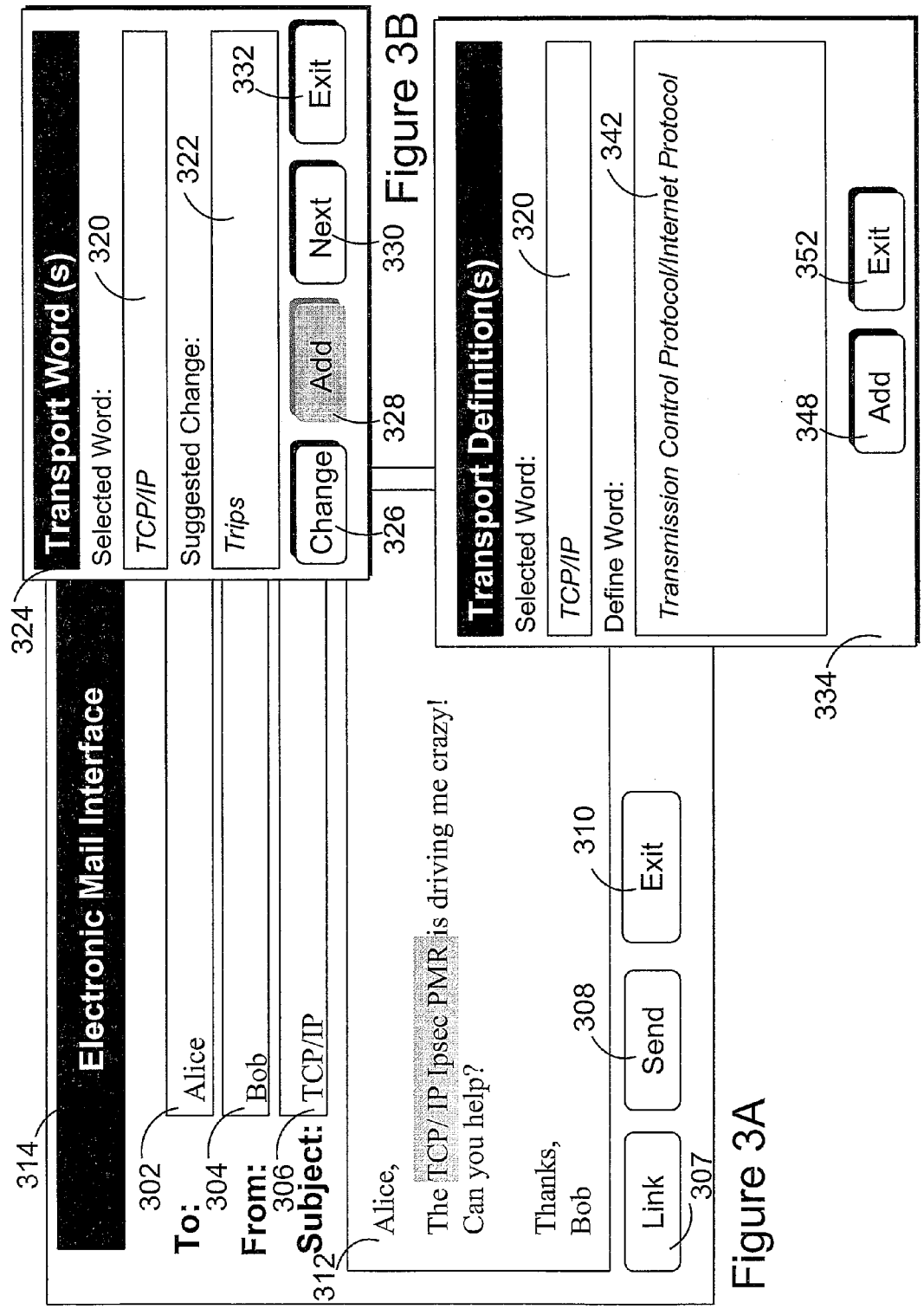
FIG. 3A illustrates a graphical user interface for creating email messages.
FIG. 3B illustrates a graphical user interface for editing dictionary transport words according to one embodiment of the invention.
FIG. 3C illustrates a graphical user interface for editing dictionary transport definitions according to one embodiment of the invention.
Figure 5:
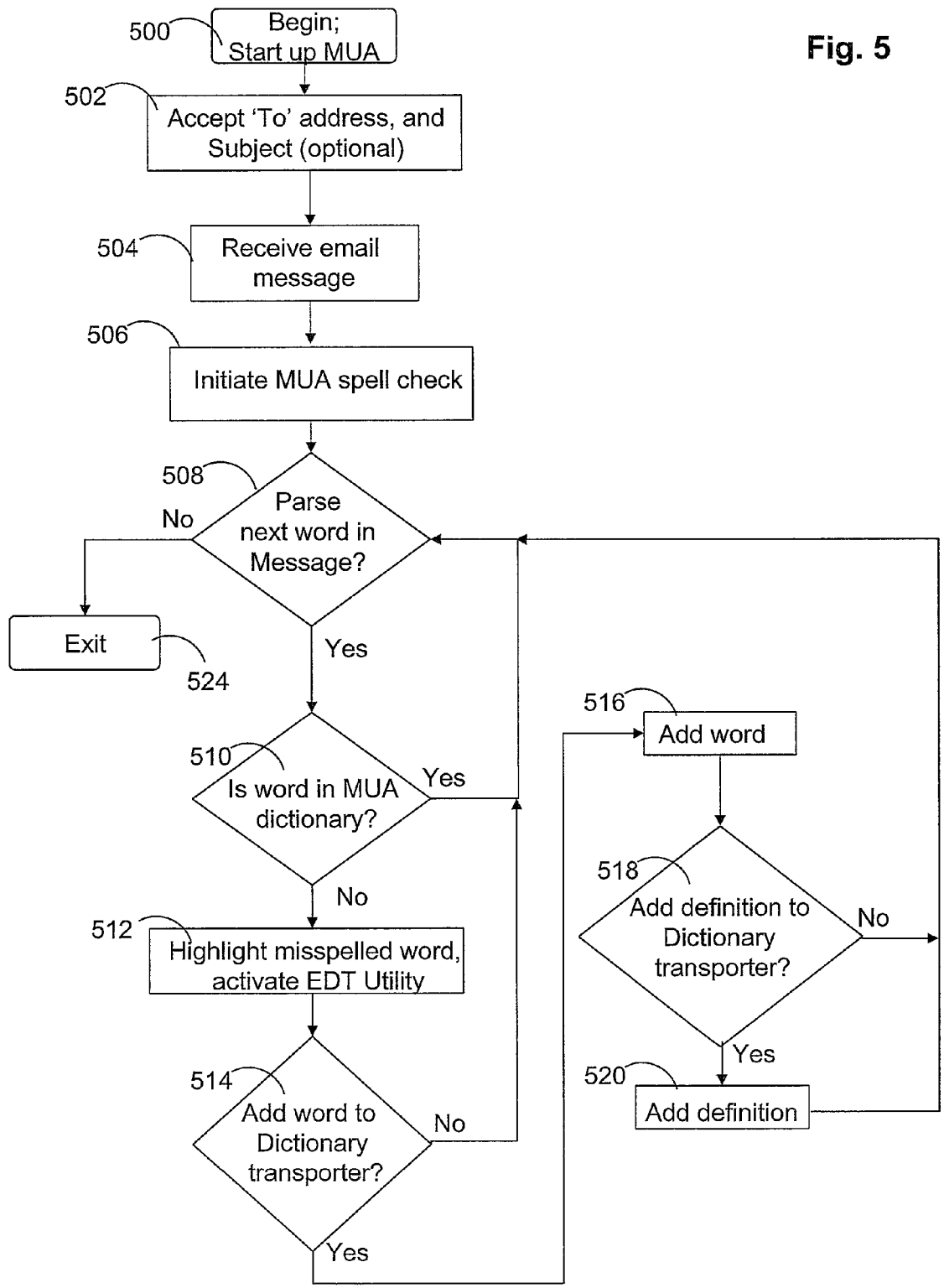
FIG. 5 is a logic flow chart illustrating implementation of email dictionary transporter utility for adding words and definitions to dictionary transporter in accordance with one embodiment of the invention.

FIG. 5 illustrates a flow chart illustrating implementation of email dictionary transporter utility for adding words and definitions to dictionary transporter during message creation. The process begins at step 500, where the mail user agent is opened. The mail user agent accepts a recipient "To" address and subject information in preparation of sending an outgoing email message at step 502. At step 504, the MUA displays a message entered in the text field 312 (FIG. 3). Spell check is initiated by MUA at step 506. At step 508, a decision is made whether to parse the next word in the message or exit the spell check. If there are no words to parse the MUA exits the spell check. Otherwise, each word in the email message is parsed in sequence. Another determination is made by the MUA at step 510 as to whether the current word is available in the MUA dictionary. If the word is available, the MUA continues to parse each word in the text field. However, if the word is not available in the MUA dictionary the word is highlighted and the EDT utility is activated at step 512. At step 514, another decision is made as whether to add the unique word to the dictionary transporter, or ignore the word and continue to search for misspelled words. If the EDT utility chooses to add the unique word to the word transporter interface at step 514, the word is added at step 516. If the EDT utility is not prompted to add a word to the dictionary transporter, the MUA continues to parse the next word in the message or exit. After adding the word to the dictionary transporter, another decision is made, at step 518 whether to add the definition of the new word to the dictionary transporter, or continue to parse words in the message. If the EDT utility is prompted to continue the search for a misspelled word the MUA continues at step 508. If the EDT utility is prompted to add a definition, the definition is added at step 520. The MUA returns to step 508 until all terms have been evaluated.

Figure 6:
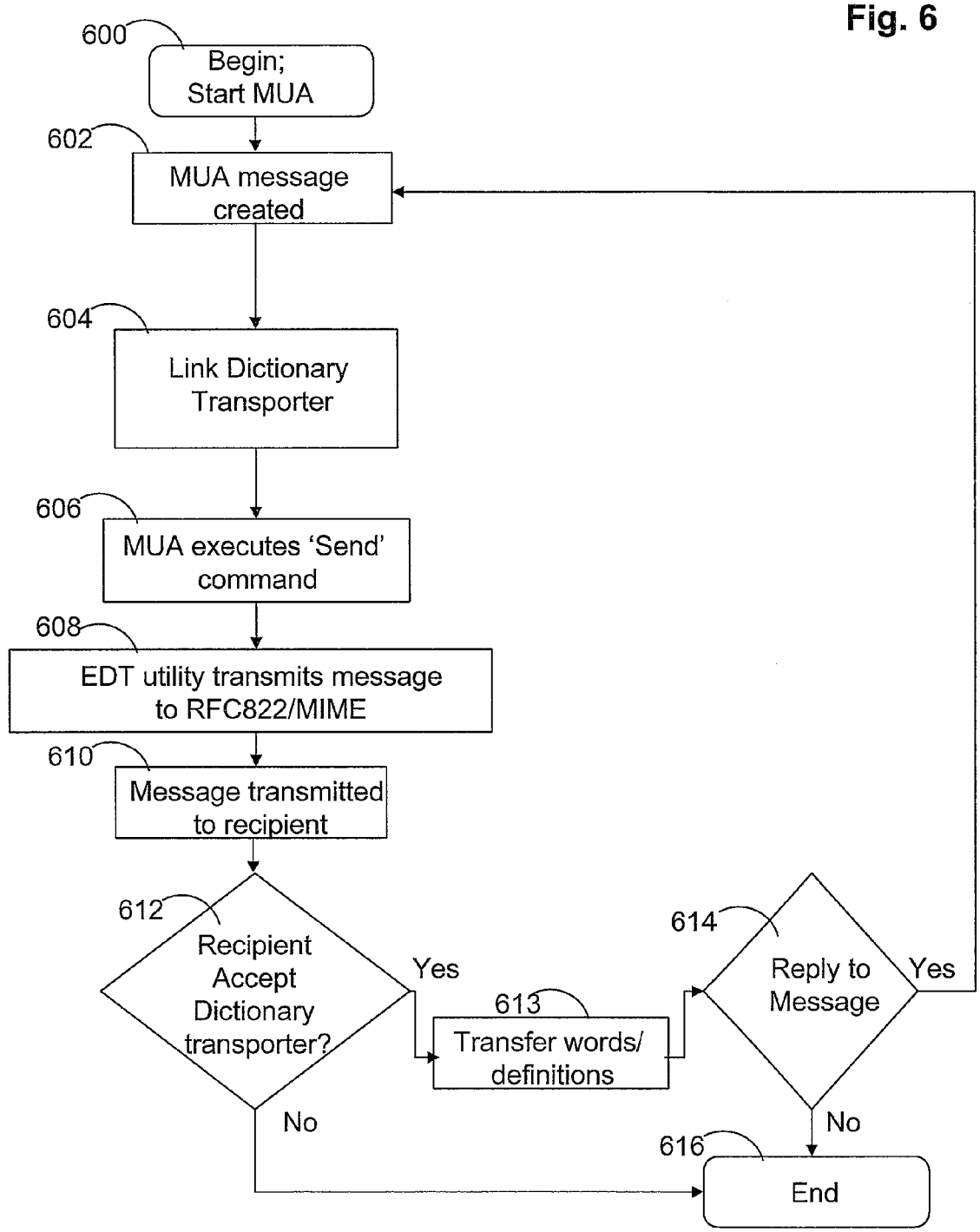
FIG. 6 is a logic flow chart illustrating message transmission with request for comments 822 (RCF822) and Multipurpose Internet Mail Extensions (MIME)

FIG. 6 is a flow chart illustrating how email containing dictionary transporter instructions is transmitted with RCF822/MIME. The process begins at step 600, where the MUA is started. At step 602 a message is created with the MUA. EDT utility is prompted to link the dictionary transporter at step 604, the MUA follows with the send command initiating MIME encoding at step 606. At step 608, the EDT utility transmits the message via the RFC822/MIME standard. The message is transmitted through the Internet to the recipient at step 610. The recipient is prompted at step 612 as to accept or reject the incoming dictionary transporter. If the decision is to not accept the dictionary transporter, the MUA ends at step 616. If the MUA is prompted to continue, the words and/or definitions are transferred to the dictionary of the recipient via the EDT utility at step 613. At step 614 the MUA replies to the message or ends at step 616. If the MUA is prompted to reply to the message at step 614, the process is repeated with the recipient of the outgoing email.

Figure 7:
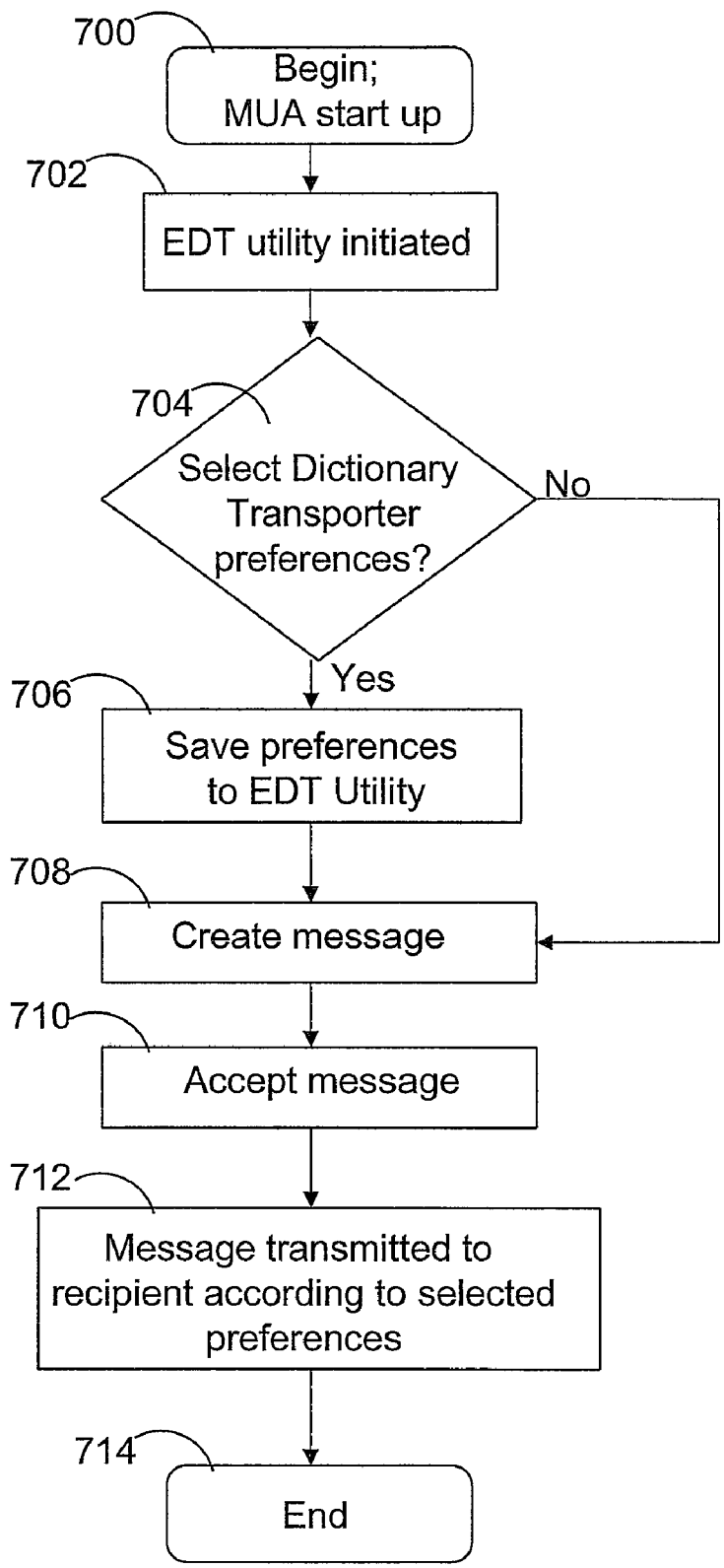
FIG. 7 is a logic flow chart illustrating implementation of the dictionary transporter preferences in accordance with one embodiment of the invention.

FIG. 7 is a flow chart illustrating implementation of the dictionary transporter preferences. The process begins at the startup of the MUA at step 700. At step 702 the EDT utility is initiated. The dictionary preference menu can be selected by activating the tools or options menus of the MUA, or at the start up of the MUA. A decision is made at step 704 whether to select preferences or continue creating an email message. If the EDT utility is prompted to continue message preparation, the process continues at step 708. However, if the EDT utility has preferences selected, the dictionary transporter preferences menu is selected, and the preferences are saved at step 706. Before (or after) the message is sent at step 710. At step 712 the message is sent to the recipient in accordance to the selected preferences of the dictionary transporter. The process ends at step 714.

In the flow charts above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In an electronic device having a mail user agent (MUA) and a mechanism for connecting to another device or network, a method comprising:
   detecting activation of a transmit function that transmits an e-mail from the electronic device; and
   transmitting, along with content of the e-mail, a dictionary associated with the MUA that defines terms and words included within the e-mail;
   wherein the MUA is a first MUA and the dictionary is a first dictionary associated with the first MUA, said method further comprising:
   receiving a second e-mail from a second MUA, wherein an envelope of said second e-mail includes a second dictionary of the second MUA;
   when specific definitions of at least one of received terms and words defined within the second dictionary are not defined within the first dictionary, prompting for an inclusion within the first dictionary of the specific definitions from within the second dictionary; and
   when said prompting receives a positive response, storing the specific definitions from the second dictionary within the first dictionary, such that a combined dictionary includes definitions of terms and words contained within the second e-mail.

2. The method of claim 1, further comprising:
   parsing through the e-mail content for terms and words that are currently undefined;
   requesting entry of one of a definition, a correct spelling, or an acceptance of a current spelling for the terms and words which are currently undefined; and
   selectively updating the content and the dictionary based on the entry received in response to the requesting step;
   wherein said dictionary comprises terminology and definitions and specific spellings of words which are unique to the MUA.

3. The method of claim 1, further comprising:
   prompting whether to include the dictionary when transmitting the e-mail; and
   including the dictionary when transmitting the e-mail in response to a positive response to said prompting.

4. The method of claim 1, wherein said selectively updating comprises:
   displaying a transport definition interface within which a specific definition of one of the terms and words may be provided;
   receiving the specific definition within the transport definition interface;
   displaying a transport word interface within which a correct spelling of a specific word among the terms and words may be provided; and
   receiving the correct spelling of the specific word within the transport word interface.

5. The method of claim 1, wherein said transmitting further comprises:
   activating a dictionary transporter, which performs an encoding of relevant dictionary terms corresponding to terms and words utilized within content of the e-mail to include within the transmitted dictionary;
   encoding the dictionary within an envelope of the e-mail utilizing Multi-purpose Internet Mail Extension (MIME) protocol, wherein the dictionary is transmitted as a content-type defined by the MIME protocol; and transferring the e-mail envelope including the dictionary via a network to a recipient MUA, wherein the recipient MUA is identified by a recipient address within the e-mail.

6. The method of claim 1, further comprising:

detecting when a next e-mail is generated at the first MUA that contains one or more of the terms and words from within the second e-mail;

when the combined dictionary includes a definition of the one or more terms and words utilized within the next e-mail, approving usage of the one or more terms and words without generating a prompt for entry of a corresponding definition during a check by the MUA for undefined terms and words;

transmitting, along with the next e-mail, relevant content of the combined dictionary corresponding to the terms and words utilized within the next e-mail;

wherein, once an inclusion of the specific definitions of the second dictionary into the first dictionary occurs, corresponding terms and words are automatically identified as being defined within the combined dictionary associated with the MUA.

7. The method of claim 6, wherein:

said detecting further comprises identifying that the next e-mail is addressed to the second MUA from which the second e-mail is initially received; and bypassing a check for definitions of all terms and words contained within the next e-mail that were included within the second email; and wherein, only definitions associated with new terms and words not previously exchanged with the second MUA are provided within a next dictionary that is transmitted along with the next email.

8. A computer program product comprising:

a computer readable medium; and program code on the computer readable medium for execution on an electronic device having a mechanism for connecting to another device or network, said program code comprising code for:

detecting activation of a transmit function that transmits an e-mail from the electronic device; and transmitting, along with content of the e-mail, a dictionary associated with the MUA that defines terms and words included within the e-mail;

wherein the MUA is a first MUA and the dictionary is a first dictionary associated with the first MUA, said code further comprising code for:

receiving a second e-mail from a second MUA, wherein an envelope of said second e-mail includes a second dictionary of the second MUA;

when specific definitions of at least one of received terms and words defined within the second dictionary are not defined within the first dictionary, prompting for an inclusion within the first dictionary of the specific definitions from within the second dictionary; and when said prompting receives a positive response, storing the specific definitions from the second dictionary within the first dictionary, such that a combined dictionary includes definitions of terms and words contained within the second e-mail.

9. The computer program product of claim 8, further comprising program code for:

parsing through the e-mail content for terms and words that are currently undefined;

requesting entry of one of a definition, a correct spelling, or an acceptance of a current spelling for the terms and words which are currently undefined; and selectively updating the content and the dictionary based on the entry received in response to the requesting step;

wherein said dictionary comprises terminology and definitions and specific spellings of words which are unique to the MUA.

10. The computer program product of claim 8, further comprising code for:

prompting whether to include the dictionary when transmitting the e-mail; and including the dictionary when transmitting the e-mail in response to a positive response to said prompting.

11. The computer program product of claim 8, wherein said code for selectively updating comprises code for:

displaying a transport definition interface within which a specific definition of one of the terms and words may be provided;

receiving the specific definition within the transport definition interface;

displaying a transport word interface within which a correct spelling of a specific word among the terms and words may be provided; and receiving the correct spelling of the specific word within the transport word interface.

12. The computer program product of claim 8, wherein said code for transmitting further comprises code for:

activating a dictionary transporter, which performs a selection of relevant dictionary terms corresponding to terms and words utilized within content of the e-mail to include within the transmitted dictionary;

encoding the dictionary within an envelope of the e-mail utilizing Multi-purpose Internet Mail Extension (MIME) protocol, wherein the dictionary is transmitted as a content-type defined by the MIME protocol; and transferring the e-mail envelope including the dictionary via a network to a recipient MUA, wherein the recipient MUA is identified by a recipient address within the e-mail.

13. The computer program product of claim 8, further comprising code for:

detecting when a next e-mail is generated at the first MUA that contains one or more of the terms and words from within the second e-mail;

when the combined dictionary includes a definition of the one or more terms and words utilized within the next e-mail, approving usage of the one or more terms and words without generating a prompt for entry of a corresponding definition during a check by the MUA for undefined terms and words; and transmitting, along with the next e-mail, relevant content of the combined dictionary corresponding to the terms and words utilized within the next e-mail;

wherein, once an inclusion of the specific definitions of the second dictionary into the first dictionary occurs, corresponding terms and words are automatically identified as being defined within the combined dictionary associated with the MUA;

wherein said code for detecting further comprises code for identifying that the next e-mail is addressed to the second MUA from which the second e-mail is initially received;

wherein said code for approving usage comprises code for bypassing a check for definitions of all terms and words contained within the next e-mail that were included within the second email; and wherein, only definitions associated with new terms and words not previously exchanged with the second MUA are provided within a next dictionary that is transmitted along with the next email.

14. A device comprising:
a processor and memory;
means for enabling electronic communication between the device and a second device;
a mail user engine (MUA) that enables transmission and receipt of electronic mail correspondence (e-mail) from and to the MUA via the means for enabling electronic communication;
a dictionary transporter utility associated with the MUA and which executes in conjunction with the MUA to provide the following functions:
  detecting activation of a transmit function that transmits an e-mail from the electronic device; and
  transmitting, along with content of the e-mail, a dictionary associated with the MUA that defines terms and words included within the e-mail;
wherein the MUA is a first MUA and the dictionary is a first dictionary associated with the first MUA, said MUA and said dictionary transport utility comprise code for:
  receiving a second e-mail from a second MUA, wherein an envelope of said second e-mail includes a second dictionary of the second MUA;
  when specific definitions of at least one of received terms and words defined within the second dictionary are not defined within the first dictionary, prompting for an inclusion within the first dictionary of the specific definitions from within the second dictionary; and
  when said prompting receives a positive response, storing the specific definitions from the second dictionary within the first dictionary, such that a combined dictionary includes definitions of terms and words contained within the second e-mail.

15. The device of claim 14, said dictionary transporter utility further providing the functions of:
  parsing through the e-mail content for terms and words that are currently undefined;
  requesting entry of one of a definition, a correct spelling, or an acceptance of a current spelling for the terms and words which are currently undefined; and
  selectively updating the content and the dictionary based on the entry received in response to the requesting step;
  wherein said dictionary comprises terminology and definitions and specific spellings of words which are unique to the MUA;
  prompting whether to include the dictionary when transmitting the e-mail; and
  including the dictionary when transmitting the e-mail in response to a positive response to said prompting;
  wherein said selectively updating comprises:
    displaying a transport definition interface within which a specific definition of one of the terms and words may be provided;
    receiving the specific definition within the transport definition interface;
    displaying a transport word interface within which a correct spelling of a specific word among the terms and words may be provided; and
    receiving the correct spelling of the specific word within the transport word interface.

16. The device of claim 14, wherein providing the functions of transmitting further comprises:
  activating a dictionary transporter, which performs a selection of relevant dictionary terms corresponding to terms and words utilized within content of the e-mail to include within the transmitted dictionary;
  encoding the dictionary within an envelope of the e-mail utilizing Multi-purpose Internet Mail Extension (MIME) protocol, wherein the dictionary is transmitted as a content-type defined by the MIME protocol; and
  transferring the e-mail envelope including the dictionary via a network to a recipient MUA, wherein the recipient MUA is identified by a recipient address within the e-mail.

17. The computer program product of claim 14, wherein said MUA and said dictionary transporter utility comprise code for:
  detecting when a next e-mail is generated at the first MUA that contains one or more of the terms and words from within the second e-mail;
  when the combined dictionary includes a definition of the one or more terms and words utilized within the next e-mail, approving usage of the one or more terms and words without generating a prompt for entry of a corresponding definition during a check by the MUA for undefined terms and words; and
  transmitting, along with the next e-mail, relevant content of the combined dictionary corresponding to the terms and words utilized within the next e-mail;
  wherein, once an inclusion of the specific definitions of the second dictionary into the first dictionary occurs, corresponding terms and words are automatically identified as being defined within the combined dictionary associated with the MUA;
  wherein said code for detecting further comprises code for identifying that the next e-mail is addressed to the second MUA from which the second e-mail is initially received;
  wherein said code for approving usage comprises code for bypassing a check for definitions of all terms and words contained within the next e-mail that were included within the second email; and
wherein, only definitions associated with new terms and words not previously exchanged with the second MUA are provided within a next dictionary that is transmitted along with the next email.

* * * * *